United States Patent
Ogus et al.

(10) Patent No.: US 7,735,083 B2
(45) Date of Patent: *Jun. 8, 2010

(54) SYSTEM AND METHOD FOR SCHEDULING A FUTURE EVENT

(75) Inventors: Aaron W. Ogus, Kirkland, WA (US); Evan J. Schrier, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1429 days.

This patent is subject to a terminal disclaimer.

(21) Appl. No.: 10/960,839

(22) Filed: Oct. 7, 2004

(65) Prior Publication Data

US 2005/0050543 A1 Mar. 3, 2005

Related U.S. Application Data

(63) Continuation of application No. 09/800,382, filed on Mar. 6, 2001, now Pat. No. 6,964,046.

(51) Int. Cl.
*G06F 9/46* (2006.01)
(52) U.S. Cl. ...................... 718/102; 718/101
(58) Field of Classification Search .............. 718/100, 718/101, 102, 104, 107; 713/500
See application file for complete search history.

(56) References Cited

U.S. PATENT DOCUMENTS

| 5,313,647 | A |   | 5/1994  | Kaufman et al. | 395/700 |
|-----------|---|---|---------|----------------|---------|
| 5,577,237 | A | * | 11/1996 | Lin            | 713/500 |
| 5,781,769 | A |   | 7/1998  | Weber          | 395/557 |
| 5,818,839 | A |   | 10/1998 | Sterne et al.  |         |
| 5,835,494 | A |   | 11/1998 | Hughes et al.  |         |
| 6,003,061 | A |   | 12/1999 | Jones et al.   | 709/104 |
| 6,396,843 | B1|   | 5/2002  | Chiussi et al. |         |
| 6,687,903 | B1| * | 2/2004  | Chalmer et al. | 718/100 |
| 7,315,901 | B1|   | 1/2008  | Bass et al.    |         |
| 7,461,159 | B2|   | 12/2008 | Tayyar et al.  |         |
| 2002/0184404 | A1| * | 12/2002 | Lerman       | 709/318 |

* cited by examiner

*Primary Examiner*—Meng-Ai An
*Assistant Examiner*—Willy W Huaracha
(74) *Attorney, Agent, or Firm*—Woodcock & Washburn LLP (57) ABSTRACT

A method for setting timers is disclosed in which an array is maintained, each element of which represents a period of time. Events which are to occur within the time period associated with the array element are linked to the array element. The events associated with each array element are executed at a pre-determined time interval. A pointer pointing to the current time period being processed wraps around to the beginning of the array when the end of the array is reached.

18 Claims, 6 Drawing Sheets

SYSTEM AND METHOD FOR SCHEDULING A FUTURE EVENT

CROSS-REFERENCE TO RELATED CASES

This application is a continuation application and claims priority to U.S. patent application Ser. No. 09/800,382, filed Mar. 6, 2001 now U.S. Pat. No. 6,964,046, entitled "System and Method for Scheduling a Future Event", which is incorporated herein by reference in its entirety.

FIELD OF THE INVENTION

The present invention relates generally to the field of computing. More particularly, the invention relates to a timer for scheduling the future initiation of an event in a computer system.

BACKGROUND OF THE INVENTION

In various computer applications, it is necessary to set and cancel timers in order to initiate events at some specified time in the future. Often, the numbers of timers that must be set and cancelled can be very large, sometimes in the thousands.

A typical timer system maintains scheduled events in a list sequenced by expiry time. While removing timers from such a list can be performed relatively simply by maintaining a doubly linked list, adding a timer to the list typically requires a time-intensive search through the list to find the proper insertion point based on the scheduled expiry of the timer.

Hence a need exists in the art for a system that supports the efficient setting and canceling of timers.

SUMMARY OF THE INVENTION

A system in accordance with the present invention maintains a primary array where each element of the array represents a window of time during which a scheduled event (or a plurality of events) is to take place. For example, an array having 1000 elements may be created, where each entry represents a 4 millisecond window, the entire array representing a four second window. Thus, the first element of the array represents the time window from time zero (i.e., some arbitrary starting time) to four milliseconds after time zero; the second element of the array represents the period of time from 4 milliseconds after time zero to eight milliseconds after time zero, etc.

Events which are to occur in the first time window (between time zero and four milliseconds after time zero) are associated with element zero of the array; events which are to occur between four milliseconds and eight milliseconds after time zero are associated with element 1 of the array, and so on. Preferably, a pointer in element zero points to a linked list of all events to occur within the first time window. Insertion of a new event into the array is accomplished by determining which array element corresponds to the time at which the event is to occur, and attaching the new event to the list associated with that array element. The scheduled time for an event is rounded off to the granularity of the window size—e.g., an event scheduled for time=3 ms after time zero is placed in the 0-4 millisecond window.

A pointer points to the element of the array that represents the current timeslot and is advanced every time period. Periodically (e.g., every 4 milliseconds, in the example) all events in the linked list associated with the current element of the array are initiated, and the pointer is advanced to the next timeslot. When the end of the array is reached, the current timeslot pointer is set to point to the zero-th element of the array again. Any event that will occur less than four seconds in the future can be slotted into the array. Since the current time pointer "wraps around" to the beginning of the array after the array has been exhausted, it is always possible to schedule events four seconds in the future, although it may be necessary to put events into cells that are "behind" the current time pointer.

Although an exemplary array of 1000 entries is described in which each element represents a time window of 4 milliseconds, it should be understood that any suitable size of array may be employed, in which each element of the array may represent any suitable time window. Since, as described above, times are rounded off to the size of the window, the size of that window can be chosen to meet the time accuracy requirements of the application in which the timer is employed.

One or more supplementary arrays may be provided to support timers that are set more than four seconds in the future. For example, if the first array represents a total time period of 4 seconds and an event is to occur 20 seconds from now, a second array (the first supplementary array) may be created to store events scheduled beyond the four-second time duration represented by the first array. Preferably, the supplementary arrays represent increasing amounts of time (e.g., the primary array may represent 4 seconds, the first supplementary array may represent the next 4000 seconds, the following array may represent the next 4,000,000 seconds, etc.) The process of creating supplementary arrays can be extended as many times as required in order to represent events as far in the future as necessary. When the current array is traversed and, eventually, exhausted, the current time slot pointer is set to point again to the first (zero-th) element of the primary array and events from the next supplementary array are placed in appropriate windows in the primary array. It should be noted that, at the time of this wrap-around, some events may already be in the primary array, since timers that are scheduled to expire less than four seconds after they are set are placed in the primary array (sometimes behind the current time pointer), rather than placing them in the supplemental array.

Other features of the invention are described below.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF THE INVENTION

Overview

Various computer applications require the setting and canceling of timers to schedule initiation of events. Typically timers are contained in a list sequenced by expiry time. Adding a timer to the list typically requires a time-intensive search through the list to find the proper insertion point, based on the expected expiry of the timer. A system in accordance with the present invention maintains an array where each element of the array represents a window of time during which an event or a plurality of events is to take place. Events which are to occur in the first time window are associated with element 0 of the array by a pointer, events which are to occur in the second time window with element 1 by a second pointer and so on. Insertion of a new event into the array is accomplished by determining which array element corresponds to the time at which the event is to occur, and attaching the new event to the list associated with that array element. Periodically all events in the linked list associated with the current element of the array are initiated.

One or more supplementary arrays may be provided to support timers that are set beyond the time represented by the primary array. When the primary array is exhausted, the pointer wraps to the beginning of the primary array, and events from the next supplementary array are slotted into appropriate windows in the primary array.

In another embodiment only a primary array exists and events that are scheduled beyond the time period represented by the primary array are stored in a doubly linked list, a structure which is well-known in the art.

Exemplary Computing Environment

Figure 1:
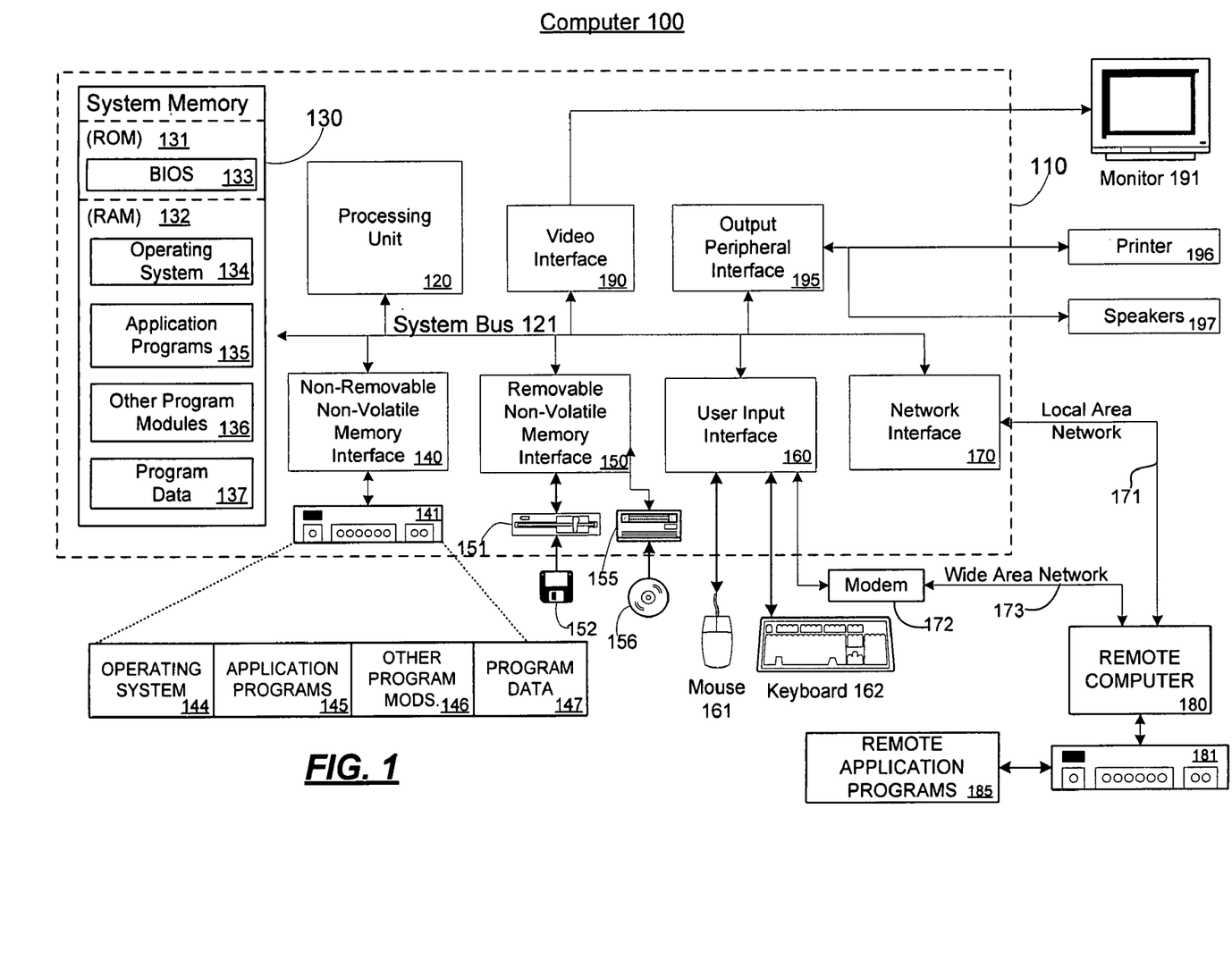
FIG. 1 is a block diagram of an exemplary computing environment in which aspects of the invention may be implemented.

FIG. 1 illustrates an example of a suitable computing system environment 100 in which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/ nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Structure for Storing Pointers to Events

Figure 2:
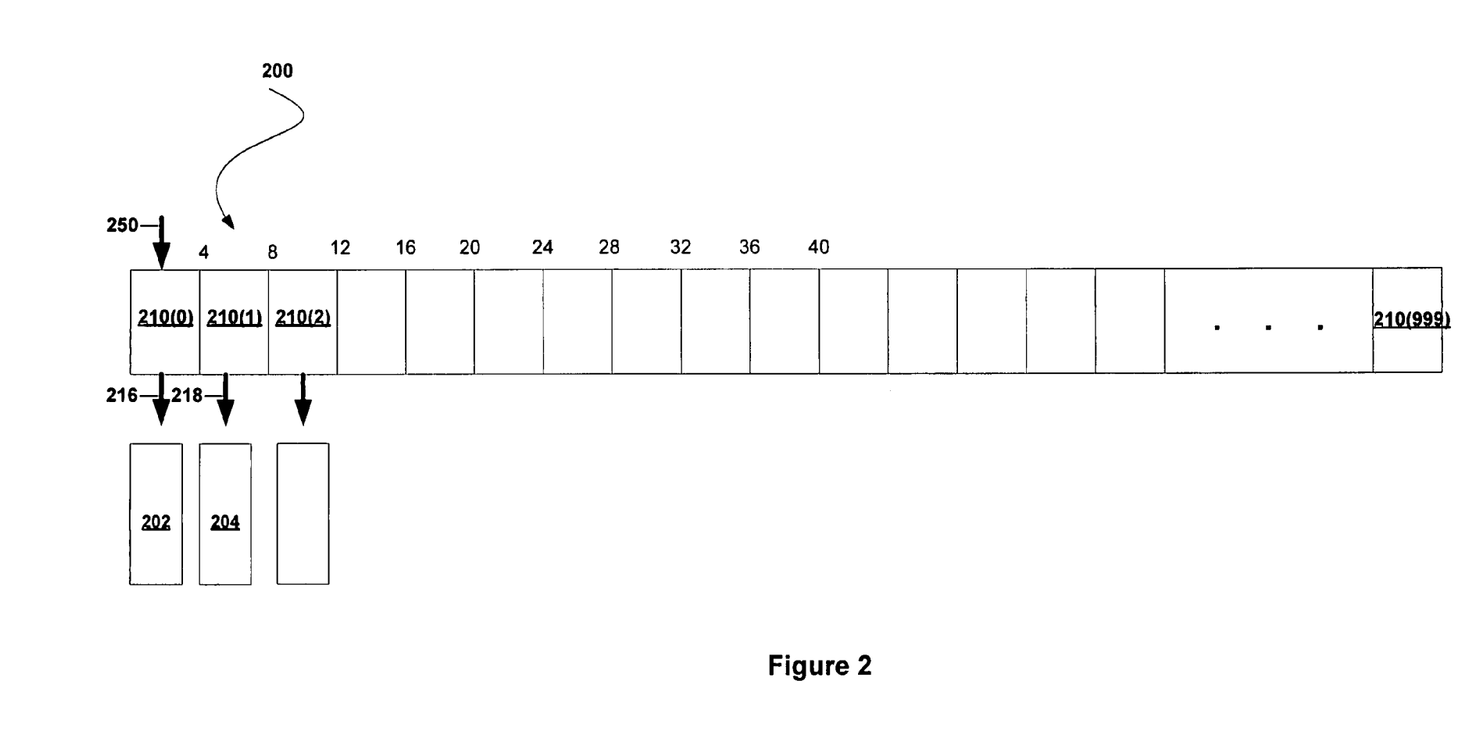
FIG. 2 is a block diagram of a data structure that stores pointers to lists of events in accordance with the invention.

FIG. 2 illustrates a data structure 200 in accordance with one aspect of the invention. In a preferred embodiment data structure 200 is a circular array (i.e., an array that can be traversed circularly by resetting its index pointer to zero when the end of the array is reached), however, it should be understood that any suitable data structure that stores data in a defined sequence may be used without departing from the spirit and scope of the invention. Data structure 200 in a preferred embodiment includes cells 210(0), 210(1), 210(2), and so on, through 210(999). In a preferred embodiment data structure 200 includes 1000 cells (numbered zero through 999), but it should be understood than any appropriate number of cells may be used. The actual number of cells in exemplary array data structure 200 is generally chosen based on the desired granularity of the timer system (i.e., how often timed events must be fired), and how far in the future a typical event will be scheduled. Each array cell 210(0) through 210(999) includes a pointer to a data structure that stores the events that are to be initiated at particular times. For example, array cell 210(0) includes pointer 216, which points to data structure 202; array cell 210(1) includes pointer 218, which points to data structure 204; and so on. A current timeslot pointer 250 points to the cell that represents the time slot that is currently being processed or will be processed next. Current timeslot pointer 250 is advanced every time period and, after the last cell in the array has been processed, wraps around to the beginning of the array. An exemplary embodiment of data structures 202 and 204 is described below in connection with FIG. 3.

In accordance with the invention an array 200 is maintained where each cell of the array 200 represents a window of time during which an event or a plurality of events is to take place. For example, a section of memory may be allocated to an array 200 containing 1000 cells where each cell, 210(0), 210(1), 210(2), etc. represents a 4 millisecond window, the entire array 200 therefore representing 4 seconds. Thus, the first cell (i.e., "cell zero") 210(0) of array 200 represents the time window from time zero (some arbitrary starting point in time) to 4 milliseconds after time zero, the second cell 210(1) of array 200 represents the period of time from 4 milliseconds from time zero to 8 milliseconds from time zero, and so on.

List structure 202 thus includes events which are to occur in the first time window (between zero and 4 milliseconds from time zero) and is associated with cell zero 210(0) of array 200 by a pointer 216. List structure 204 contains events which are to occur between 4 milliseconds and 8 milliseconds from time zero and are associated with cell one 210(1) of array 200, and so on. Preferably, a pointer 216 stored in cell zero 210(0) points to a doubly linked list 202 of all events to occur within the first time slot, a pointer 218 stored in cell one 210(1) points to a doubly linked list 204 of all events to occur within the second time slot and so on. It should be understood that maintaining events in a particular time slot in the form of a doubly linked list pointed to by a cell of array 200 is merely exemplary. Events in a particular time slot may be stored in any appropriate data structure referenced by the respective cells of array 200.

Structure of a List of Events

Figure 3:
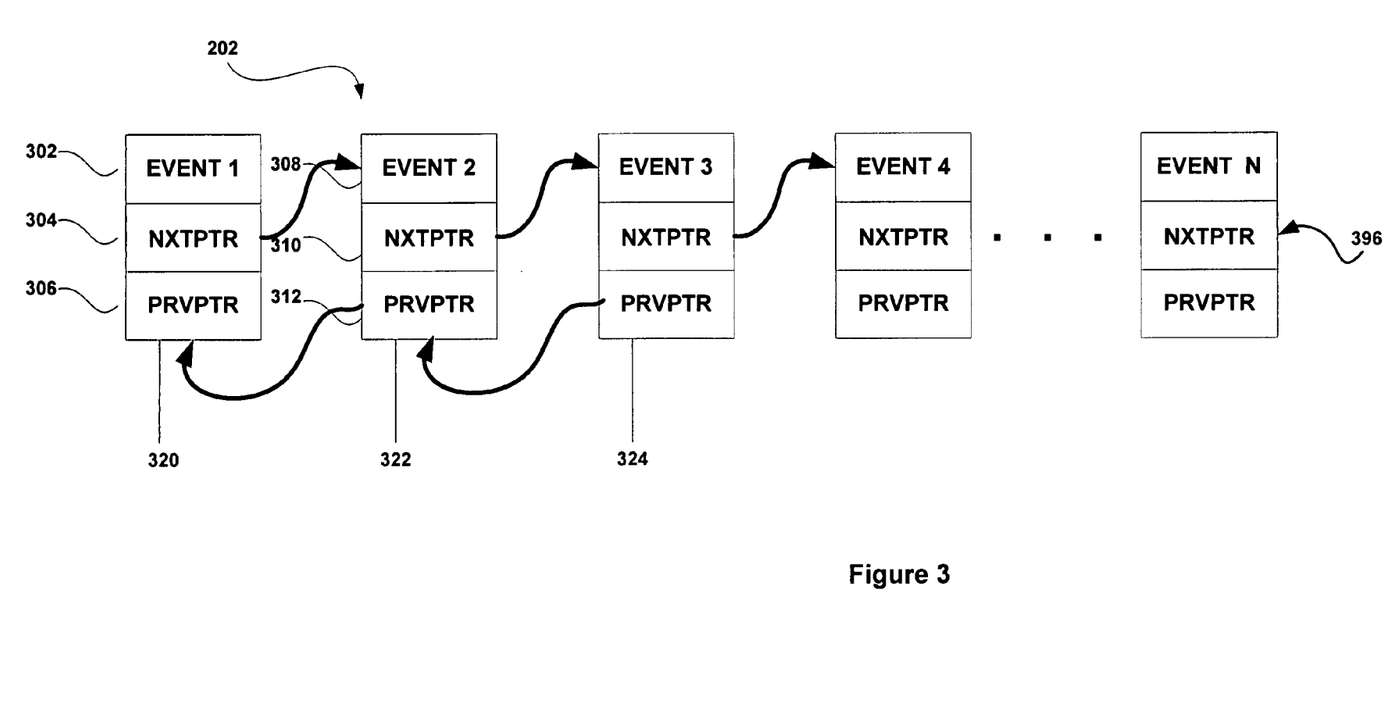
FIG. 3 is a block diagram of a list data structure that stores scheduled events in accordance with the invention.

FIG. 3 illustrates a list of scheduled events 202 associated with a time window represented by cell 210(0) of array 200. List 202 in a preferred embodiment is a doubly linked list, but it should be understood that any appropriate data structure (e.g., doubly linked list, array, etc.) may be used to store scheduled events in a time window. A doubly linked list is particularly preferable, because it is expandable to an arbitrary size. List 202 includes list elements 320, 322, 324, etc. In a preferred embodiment, each list element 320, 322, 324 contains a scheduled event (EVENT-2 308 in exemplary list element 322), a pointer to the next element in the list (NXTPTR 310 in exemplary list element 322) and a pointer to the previous element in the list (PRVPTR 312 in exemplary list element 322). The scheduled event may, for example, be represented as a pointer to a function that carries out the scheduled event. The first element 320 in list 202 may contain a pointer to the head of the list in that element's PRVPTR field, and the last element may contain a pointer to the head of the list in that element's NXTPTR field. An empty list may be represented by a single element whose previous pointer and next pointer fields both point self-referentially to the element itself.

As noted above, list structure 202 thus includes events which are to occur in the first time window (between zero and 4 milliseconds from time zero) and is associated with cell zero 210(0) of array 200 by a pointer 216 (shown in FIG. 2). Linked list 202 contains the events that are to occur within the first time window.

Insertion of a new event into array 200 is accomplished by determining which array cell 210(0), 210(1), 210(2), etc. corresponds to the time at which the event is to occur, and attaching the new event to the list associated with that array cell. To calculate the array cell to which an event should be attached, an offset is calculated by dividing the time at which the event is scheduled by the window size. The offset is added to the current slot (the number of the cell pointed to by the current timeslot pointer); the result is then divided by the size of the array, and the remainder of that division operation is then used as the cell into which the new event is to be inserted. For example, if an event is scheduled to occur at 21 ms from the current time and the current timeslot being processed is cell 998, the calculation works as follows: 21 ms divided by 4 ms per timeslot=5; (998+5) mod 1000=3. Thus, the event is added to the event list associated with the third cell of the array. It should be noted that the use of modulo arithmetic defines a "wrap-around" property, such that it is possible to schedule events up to four seconds in the future (or, more generally, if the array represents n seconds in duration, then it is always possible to schedule events n seconds in the future). Since traversal of the array wraps around to the beginning in an endless circle, there are always four seconds worth of cells ahead of the current time pointer, even if some of those cells have index values that are less than the current time pointer. The use of a circular "wrap-around" array is known in the art, and thus is not further described herein. The scheduled time for an event is rounded off to the granularity of the window size—e.g., an event scheduled to take place 3 milliseconds from time zero is placed in the list associated with the time period between time zero and 4 milliseconds after time zero. A new event may be added to doubly linked list 202, 204 by setting the pointer in the appropriate cell of array 200 (e.g., pointer 216, if the new event is scheduled between zero and 4 milliseconds from time zero) to point to new event 320; in this case, the new event's NXTPTR may be set to point to the list element that was previously the first element in the list, and the former first element's PVRPTR may be set to point to the new element. It should be noted that, in a preferred embodiment, new elements may be added to either the beginning or end of the list; since events are initiated only as frequently as the granularity supported by array 200 (e.g., every 4 milliseconds), events within a particular time window are given equal priority.

Structure of a Supplementary Array

Figure 4:
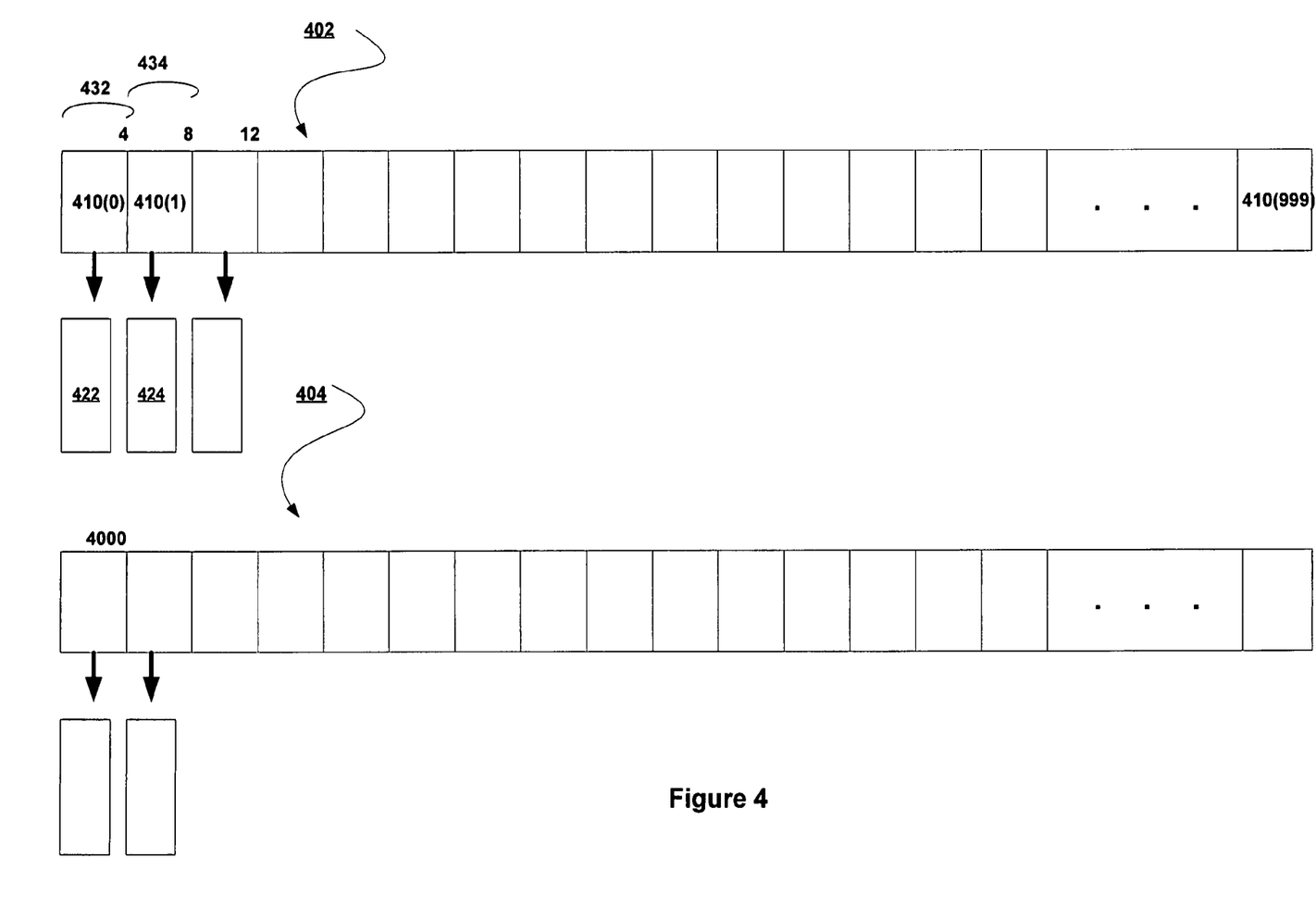
FIG. 4 is a block diagram of exemplary supplementary data structures for storing events in accordance with the invention.

FIG. 4 illustrates additional data structures 402, 404, etc. for storing pointers to lists of events in accordance with the invention. It can be seen that the structure of data structures 402, 404, etc. are substantially similar to data structure 200. The time periods, however, represented by one cell of 402, 404, etc., preferably represent different length periods of time than those represented by one cell of data structure 200. For example, in a preferred embodiment, one cell of supplementary array 402 may represent the length of time represented by the entire data structure 200, as further discussed below. Event lists 422, 424 thus represent events that are to occur within the time period that cell 410(0), 410(1) respectively, represents.

Supplementary data structures 402, 404, etc. may take the form of arrays. These arrays are provided to support timers that are set beyond the time represented by first array 200. For example, if a first array 200 represents a total time period of 4 seconds and an event is to occur 8 seconds from time zero, a second array 402 may be created to store events scheduled to occur beyond the four-second time duration represented by first array 200. Supplemental array 402 in a preferred embodiment may include a number of cells each of which represents the period of time the entire first array represents. In the above example, each cell would represent a 4-second period of time, i.e. cell zero 410(0) represents the time period 432 from 4 seconds after time zero until 8 seconds after time zero and cell one 410(1) represents the time period 434 from 8 seconds after time zero until 12 seconds after time zero.

Preferably, supplementary arrays 402, 404, etc. represent increasing amounts of time (e.g., first array 200 represents 4 seconds, first supplemental array 402 may represent the next 4000 seconds if supplemental array 402 contains 1000 cells, and second supplemental array 404 may represent the next 4,000,000 seconds if second supplemental array 404 contains 1000 cells, etc.) An arbitrary number of supplementary arrays may be created in order to represent events as far in the future as necessary. Each supplemental array may contain any suitable number of cells in order to represent times as far in the future as may be appropriate for the application in which the invention is embodied. The number of cells chosen for both the first array and the supplementary arrays represent a tradeoff between speed of processing and memory required.

In another embodiment no supplementary arrays are created and there is a maximum time period beyond which the algorithm cannot be used. For example, as noted above, if the primary array represents a total n second duration, then it is always possible to schedule events n seconds in the future using a primary array. If an embodiment of the invention constrains the scheduling of events such that no event can be scheduled more than n seconds in the future, then the use of one or more supplemental arrays is not necessary.

Structure of a List Associated with a Supplementary Array

Event lists 422, 424, etc. associated with supplementary arrays 402, 404, etc. are substantially similar to event lists 202, 204 associated with primary array 200 etc. with the exception that event lists 422, 424, etc. in addition to including event data, a next pointer and a previous pointer, also include the time from the beginning of the window in the supplementary array at which the event is to take place. For example, assume that the current time is time zero (current timeslot pointer is pointing to cell zero). Assume further, a primary array representing events taking place in the first 4000 ms from time zero, a first supplementary array representing events taking place from 4000 ms to 4,004,000 ms from time zero and an event that to occur 5768 ms in the future. The event that is to occur at 5768 ms from time zero occurs beyond the time period represented by the primary array. Because the event occurs between 4000 and 8000 ms from time zero, the event will be associated with the first cell of the first supplementary array (5768 ms/4000 ms/cell=1 remainder 1768). The time 1768 (5768−4000) is stored in the event list so that when the primary array is exhausted, and events from the supplementary array are used to repopulate the primary array, the event can be placed in the proper timeslot of the primary array.

Processing Event Lists

Figure 5:
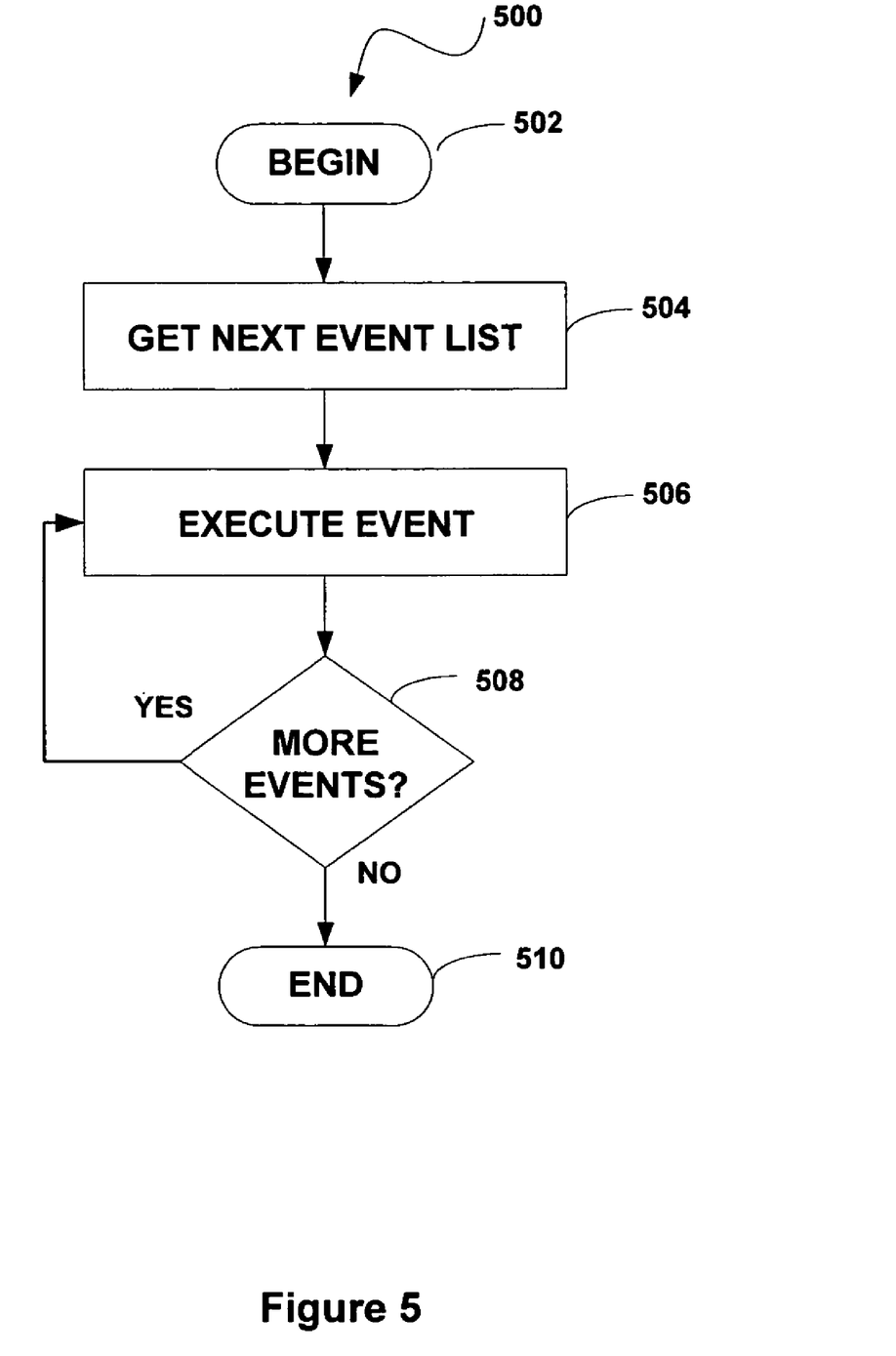
FIG. 5 is a flow diagram of a process for traversing an event array in accordance with the invention.

FIG. 5 is a flow diagram depicting a process 500 for initiating timed events by traversing data structure 200 of FIG. 2. Periodically (e.g., every 4 milliseconds, in the example) all events in the linked list 202, 204, etc. associated with the element pointed to by current timeslot pointer 250 of array 200, are initiated.

At step 502 processing begins when some time is reached. For example, at 4 milliseconds after time zero, (where time zero represents processing start time) processing begins for cell zero 210(0) of array 200 (shown in FIG. 2). At step 504, linked list 202 is retrieved. At step 506, the first event 302 of linked list 202 is executed. At step 508, a determination is made as to whether there are additional events in the list. If NXTPTR 304 of the current list element 320 points to the head of the list 302, the end of list 202 has been reached and processing ends at step 510. If NXTPTR 304 contains a pointer which does not point to the head of the list, pointer address 304 is referenced and EVENT 2 308 of list element 322 is executed. This process continues until the end of the list is reached. The current timeslot pointer is then advanced to point to the next cell and the just-processed (previous) event list is set to a list containing no elements.

Process 500 is repeated at the expiration of every time window represented by array 200. For example, when the next time period (8 milliseconds after time zero) is reached, linked list 204 is traversed by process 500, and so on until the end of array 200 is reached. Once the end of the array is reached, the current timeslot pointer is "advanced" by returning it to point to cell 0. This is the "wrap-around" property discussed above. For example, if I is the current timeslot pointer, then the instruction "I=(I+1) mod 1000" may be used to advance the current timeslot pointer through the array in an "endless circle."

Figure 6:
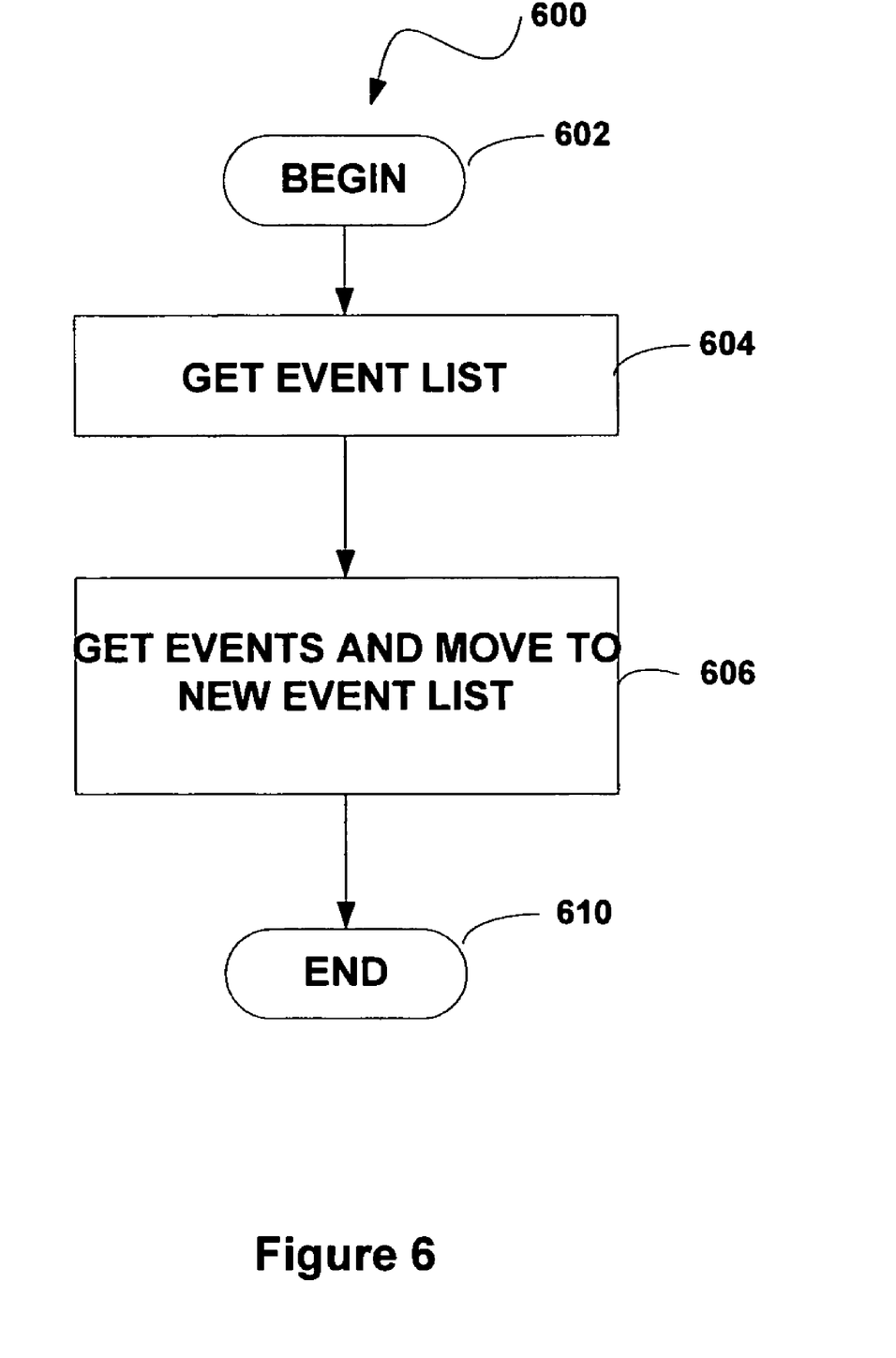
FIG. 6 is a flow diagram of a process for using a supplementary array in accordance with the invention.

FIG. 6 illustrates a flow diagram of a process for repopulating array 200 when the end of array 200 is reached. Where supplemental arrays are used, process 600 is performed each time the end of the current array 200 is reached in order to populate the primary array with events stored in supplementary arrays, 402, 404, etc. As noted above, when the end of array 200 is reached, current timeslot pointer is set to point to the first cell 210(0), and events scheduled for the next four-second period are added to event lists in the primary array 200. Events are added from array 402 (shown in FIG. 4) and placed into appropriate time slots in array 200. For example, in exemplary array 402 which has 1000 cells representing a total of 4000 seconds, the next four seconds of time are represented by the first cell (cell zero) of array 420. For example, cell zero of array 402 represents events scheduled for the time period between four seconds after time zero (start of processing) and 8 seconds after time zero; corresponding to the second time primary array 200 is being processed. Events from supplementary array cell zero are slotted into array 200 by process 600 described below.

At step 602 processing begins. At step 604, the list of events 422 (shown in FIG. 4) pointed to by cell zero 410(0) of array 402 is accessed. At step 606, the events in list 422 are slotted appropriately into array 200—i.e., those events scheduled between zero and 4 milliseconds after the current time (4 seconds from time zero) are placed in event list 202 (associated with cell 210(0)), events scheduled between 4 and 8 milliseconds from now are placed in event list 204 (associated with cell 210(1)), and so on. In the example of FIG. 6, the events from array 402 that are slotted into the new array 200 are taken from the zero-th element of array 402. However, if the end of array 402 had been reached, then after populating array 200 with new events, array 402 would be repopulated with events from array 404 (shown in FIG. 4).

It is noted that the foregoing examples have been provided merely for the purpose of explanation and are in no way to be construed as limiting of the present invention. While the invention has been described with reference to various embodiments, it is understood that the words which have been used herein are words of description and illustration, rather than words of limitation. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

What is claimed is:

1. A processor-implemented method of processing events, the method comprising:
   creating a primary array on the processor comprising a plurality of array cells, wherein each array cell is associated with a time interval defined by a respective start time and a respective end time;
   creating a plurality of list data structures, wherein each of the plurality of list data structures is associated with a respective array cell and each of the plurality of list data structures stores a list of events scheduled within a corresponding time interval;
   upon a request to schedule a new event for a predetermined event time:
      determining a target array cell by:
         calculating an offset value by dividing the predetermined event time by the time interval;
         adding the offset value to a current time slot to generate a first result;
         dividing the first result by a size of the primary array to generate a remainder, the remainder corresponding to the target array cell to which the new event should be associated;
      adding the new event to a corresponding list data structure associated with the target array cell;
   upon expiration of a predetermined time interval:
      updating a current timeslot pointer to point to a current array cell as a function of a current time;
      retrieving a current list data structure associated with the current array cell;
      executing each event in the current list data structure; and
      if the current timeslot pointer points to a last array cell in the primary array, repopulating the primary array using events associated with a secondary array, wherein the secondary array is a circular array.

2. The method of claim 1, wherein each list data structure is a linked list.

3. The method of claim 1, wherein the primary array is a circular array.

4. The method of claim 1, wherein the new event is associated with a pointer to a function that executes the new event.

5. The method of claim 1, wherein the primary array is associated with a primary array start time and a primary array end time representing a first time period.

6. The method of claim 5, wherein in response to determining that the predetermined time associated with the new event falls outside the primary array start time and the primary array end time, creating the secondary array, the secondary array comprising a plurality of second array cells, each second array cell respectively associated with a respective second start time and a second end time representing a multiple of the first time period.

7. The method of claim 1, wherein each list data structure is a doubly linked list.

8. The method of claim 7, wherein executing each event in the current list data structure further comprises:
   executing a first event in the current list data structure;
   determining whether there are additional events in the current list data structure;
   if there are no additional events, ending processing; and
   if there are additional events, processing the additional events.

9. The method of claim 6 wherein each of the plurality of second array cells is associated with a respective second list data structure and the primary array is repopulated with the plurality of second array cells in the second list data structure upon a predetermined event.

10. The method of claim 9, wherein each second list data structure is a linked list.

11. A computer-readable storage medium comprising computer-executable instructions for performing the method of claim 1.

12. A processor-implemented method for initiating timed events by traversing a data structure comprising:
   in response to an expiration of a predetermined time interval, advancing a pointer to point to a first array cell of a primary array comprising the first array cell and a second array cell, the first array cell associated with a first linked list and a first time period and the second array cell associated with a second linked list and a second time period;
   retrieving the first linked list comprising a plurality of events associated with the first time period;
   executing the plurality of events associated with the first time period;
   advancing the pointer to point to the second array cell in the primary array;
   retrieving the second linked list comprising a plurality of events associated with the second time period;
   executing the plurality of events associated with the second time period;
   in response to executing all of the plurality of events associated with the second time period, repopulating the first linked list with a plurality of events associated with a third time period, the third time period occurring subsequent in time to the first time period and the second time period; and
   repopulating the second linked list with a plurality of events associated with a fourth time period stored in a secondary array, the fourth time period occurring subsequent in time to the first time period, the second time period, and the third time period.

13. A computer-readable storage medium comprising computer-executable instructions for performing the method of claim 12.

14. A system for scheduling future events comprising:
   a processor, wherein the processor is adapted to:
   create a primary array comprising a plurality of array cells, wherein each array cell is associated with a time interval defined by a respective first start time and a first end time;
   create a plurality of list data structures, wherein each list data structure is associated with a respective first array cell of the primary array and each list data structure stores a list of first events scheduled within a corresponding time interval associated with the respective first array cell;
   upon a request to schedule a new event for a predetermined event time:
      determine a target array cell in the primary array by:
         calculating an offset by dividing the predetermined event time by the time interval;
         adding the offset to a current time slot to generate a first result;
         dividing the first result by a size of the primary array to generate a remainder, wherein the remainder corresponds to the target array cell to which the new event should be associated;
      add the new event to a corresponding list data structure associated with the target array cell;
   upon expiration of a predetermined time interval:
      update a current timeslot pointer to point to a current array cell in the primary array;
      retrieve a current list data structure associated with the current array cell;
      execute each first event in the current list data structure; and
      if the current timeslot pointer points to a last array cell in the primary array, repopulate the primary array using events associated with a circular secondary array.

15. The system of claim 14 wherein the new event is associated with a pointer to a function that executes the event.

16. The system of claim 15, wherein the primary array comprises a circularly linked list.

17. The system of claim 16, wherein each list data structure is a doubly linked list.

18. The system of claim 16, wherein the primary array comprises a doubly linked list.

* * * * *